United States Patent
Perron (10) Patent No.: US 9,641,243 B2
(45) Date of Patent: May 2, 2017

(54) SAFE-MODE OTDR METHOD

(71) Applicant: EXFO INC., Québec (CA)

(72) Inventor: Stéphane Perron, Lévis (CA)

(73) Assignee: EXFO INC., Quebec (CA)

( * ) Notice: Subject to any disclaimer, the term of this patent is extended or adjusted under 35 U.S.C. 154(b) by 0 days.

(21) Appl. No.: 15/050,146

(22) Filed: Feb. 22, 2016

(65) Prior Publication Data

US 2016/0248499 A1 Aug. 25, 2016

Related U.S. Application Data

(60) Provisional application No. 62/119,480, filed on Feb. 23, 2015.

(51) Int. Cl.
*H04B 10/071* (2013.01)

(52) U.S. Cl.
CPC .................. *H04B 10/071* (2013.01)

(58) Field of Classification Search
CPC ...... H04B 10/071; H04B 10/07; H04B 10/00; H04J 14/0227; G01M 11/3136
See application file for complete search history.

(56) References Cited

U.S. PATENT DOCUMENTS

| | | |
|---|---|---|
| 3,973,258 A | 8/1976 | Cerni et al. |
| 4,289,398 A | 9/1981 | Robichaud |
| 4,893,006 A | 1/1990 | Wakai et al. |
| 4,898,463 A | 2/1990 | Sakamoto et al. |
| 5,069,544 A | 12/1991 | Buerli |
| 5,093,568 A | 3/1992 | Maycock |

(Continued)

FOREIGN PATENT DOCUMENTS

| | | |
|---|---|---|
| EP | 1126265 A1 | 8/2001 |
| EP | 1236985 A2 | 9/2002 |

(Continued)

OTHER PUBLICATIONS

Written Opinion of the International Searching Authority dated Sep. 7, 2011; International Application No. PCT/CA2011/000625; International Filing Date: May 26, 2011; Applicant: EXFO Inc.

(Continued)

*Primary Examiner* — Ted Wang
(74) *Attorney, Agent, or Firm* — Erise IP, P.A.

(57) ABSTRACT

A safe-mode OTDR method for characterizing an optical fiber link is provided, as well as an OTDR apparatus operating under such a safe mode. The method includes performing OTDR acquisitions along the fiber link using an OTDR apparatus connected at a proximal end of the optical fiber link, and operating under OTDR acquisition conditions that have been deemed safe for a communication device at a distal end of the fiber link. The obtained reflectometric trace, representing a proximal portion of the optical fiber link, is used to determine a partial-link loss value associated with the proximal portion of the fiber link. Modified acquisition conditions that are safe for the communication device are determined based on the partial-link loss value and on loss-related maximum rating parameters for the communication device. The process is repeated using the modified OTDR acquisition conditions until the end of the link has been reached.

21 Claims, 7 Drawing Sheets

(56) References Cited

U.S. PATENT DOCUMENTS

| | | | |
|---|---|---|---|
| 5,155,439 | A | 10/1992 | Holmbo et al. |
| 5,179,420 | A | 1/1993 | So et al. |
| 5,323,224 | A | 6/1994 | Wada |
| 5,365,328 | A | 11/1994 | Anderson |
| 5,373,356 | A | 12/1994 | Anderson |
| 5,491,548 | A | 2/1996 | Bell et al. |
| 5,528,356 | A | 6/1996 | Harcourt |
| 5,592,282 | A | 1/1997 | Hartog |
| 5,596,409 | A | 1/1997 | Marcus et al. |
| 5,686,986 | A | 11/1997 | Li et al. |
| 5,708,500 | A | 1/1998 | Anderson |
| 5,731,869 | A | 3/1998 | Minami |
| 5,754,284 | A | 5/1998 | Leblanc et al. |
| 5,825,479 | A | 10/1998 | Thompson et al. |
| 5,929,982 | A | 7/1999 | Anderson |
| 5,963,313 | A | 10/1999 | Anderson |
| 6,009,220 | A | 12/1999 | Chan et al. |
| 6,445,445 | B1 | 9/2002 | Nakayama et al. |
| 6,519,026 | B1 | 2/2003 | Holland |
| 6,542,228 | B1 | 4/2003 | Hartog |
| 6,611,322 | B1 | 8/2003 | Nakayama et al. |
| 6,970,247 | B2 | 11/2005 | Yankielun |
| 7,016,024 | B2 | 3/2006 | Bridge et al. |
| 7,042,559 | B1 | 5/2006 | Frigo et al. |
| 7,088,436 | B2 | 8/2006 | Saunders et al. |
| 7,284,903 | B2 | 10/2007 | Hartog |
| 7,415,206 | B1 | 8/2008 | Birk et al. |
| 7,593,098 | B2 | 9/2009 | Brendel |
| 7,620,513 | B2 | 11/2009 | Nakayama et al. |
| 7,668,411 | B2 | 2/2010 | Davies et al. |
| 7,859,654 | B2 | 12/2010 | Hartog |
| 7,995,209 | B2 | 8/2011 | Hartog |
| 8,134,696 | B2 | 3/2012 | Hartog |
| 8,213,002 | B2 | 7/2012 | Kassler et al. |
| 8,406,620 | B2 | 3/2013 | Khermosh et al. |
| 8,576,389 | B2 | 11/2013 | Perron et al. |
| 8,660,423 | B2 | 2/2014 | Vandewege et al. |
| 8,687,957 | B2 | 4/2014 | Perron |
| 8,724,102 | B2 | 5/2014 | Urban |
| 9,170,173 | B2 | 10/2015 | Perron et al. |
| 2003/0030786 | A1 | 2/2003 | Shurgalin et al. |
| 2005/0174563 | A1* | 8/2005 | Evans ............... H04B 10/071 356/73.1 |
| 2008/0100828 | A1 | 5/2008 | Cyr et al. |
| 2009/0086193 | A1 | 4/2009 | Aoki |
| 2009/0190921 | A1 | 7/2009 | Nakajima et al. |
| 2010/0002226 | A1 | 1/2010 | Hartog |
| 2011/0149270 | A1 | 6/2011 | Nagel et al. |
| 2012/0067118 | A1 | 3/2012 | Hartog et al. |
| 2012/0243863 | A1 | 9/2012 | Zhao et al. |
| 2013/0088718 | A1 | 4/2013 | Perron et al. |
| 2013/0148958 | A1 | 6/2013 | Liang et al. |
| 2013/0222811 | A1 | 8/2013 | Handerek |
| 2014/0037285 | A1 | 2/2014 | Perron et al. |
| 2016/0013860 | A1 | 1/2016 | Perron et al. |

FOREIGN PATENT DOCUMENTS

| | | | |
|---|---|---|---|
| JP | 2007093405 | A | 4/2007 |
| WO | 2009018235 | A1 | 2/2009 |
| WO | 2009137823 | A1 | 11/2009 |
| WO | 2010043056 | A1 | 4/2010 |
| WO | 2011147030 | A1 | 12/2011 |

OTHER PUBLICATIONS

Notification of Transmittal of International Preliminary Report on Patentability dated Oct. 1, 2012; International Application No. PCT/CA2011/000625; International Filing Date: May 26, 2011; Applicant: EXFO Inc.

Tektronix, Optimize Quality of Service in Fiber Optic Networks with Intelligent OTDRs, IntelliTrace Technical Brief, 2001, www.tektronix.com/commtest.

Enomoto, Y. et al., Over 31.5 dB Dynamic Range Optical Fiber Line Testing System with Optical Fiber Fault Isolation Function for 32-Branched PON, Thursday Afternoon, OFC 2003, vol. 2, pp. 608-609, NTT Access Network Service Systems Laboratories, Tsukuba, Japan.

Koshikiya, Y. et al., Newly Developed Optical Fiber Line Testing System Employing Bi-Directional OTDRs for PON and In-Service Line Testing Criteria, Ieice Trans. Commun., vol. E90-B, No. 10, Oct. 2007, pp. 2793-2802, The Institute of Electronics, Information and Communication Engineers.

Extended European Search Report dated May 29, 2015; European Patent Application No. 11785951.2; Applicant: Exfo Inc.

Invalidity Search for U.S. Pat. No. 8,576,389; Report Dated: Aug. 13, 2015.

Kapron, Felix P. et al.; Fiber-Optic Reflection Measurements Using OCWR and OTDR Techniques; Journal of Lightwave Technology; vol. 7, No. 8; Dated: Aug. 1989; <http://ieeexplore.ieee.org/stamp/stamp.jsp?tp=&arnumber=32388&isnumbe-r=1404>.

Legre, Matthieu et al.; High resolution optical time domain reflectometer based on 1.55.mu.m up-conversion photon-counting module; Optical Society of America; Dated: 2007; <https://www.osapublishing.org/oe/fulltext.cfm?uri=oe-15-13-8237&id=13-8571>.

Zhang, ,Ziyi et al.; Distributed optical fiber vibration sensor based on spectrum analysis of Polarization-OTDR system; Optical Society of America; Dated: 2008; <https://www.osapublishing.org/oe/fulltext.cfm?uri=oe-16-14-10240&id=1-65522>.

Polytec, palmOTDR/N Series Handheld OTD, Apr. 26, 2010, www.shinewaytech.com.

JDSU, T-BERD/MTS-2000/-4000 Platforms, LA OTDR Module, Communications Test & Measurement Solutions, Oct. 2012, www.jdsu.com/test.

JDSU, T-BERD/MTS-6000/-6000A/-8000 Platforms, 8100-Series OTDR EVO Module Family, Communications Test & Measurement Solutions, Oct. 2012, www.jdsu.com/test.

Anritsu, MT9083 Series, MT9083A/B/C Access Master, 850/1300 nm OTDR for Multimode Fiber, 780/1310/1383/1490/1550/1625// 1650 nm OTDR for Single Mode Fiber, Catalog No. MT9038 Series E-A-A(4.00), Oct. 13, 2009.

JDSU, T-BERD/MTS-4000 Multiple Services Test Platforms, Metro-Access (MA) OTDR Module, Communications Test & Measurement Solutions, Feb. 2010, www.jdsu.com/test.

JDSU, T-BERD/MTS-2000/-4000 Platforms, 4100-Series OTDR Modules, Communications Test & Measurement Solutions, Oct. 2012, www.jdsu.com/test.

U.S. Appl. No. 13/699,982, select file history dated Nov. 26, 2012 through Jul. 3, 2013, 28 pages.

U.S. Appl. No. 14/044,768, select file history dated Apr. 14, 2014 through Oct. 7, 2015, 102 pages.

U.S. Appl. No. 14/860,277, select file history dated Apr. 15, 2016, 10 pages.

* cited by examiner

SAFE-MODE OTDR METHOD

TECHNICAL FIELD

The technical field generally relates to the field of Optical Time Domain Reflectometry (OTDR) employed for safely troubleshooting fiber links connected to a communication device.

BACKGROUND

Testing of payload-carrying network fibers with an OTDR ("live fiber testing") is a recent application, mainly driven by Passive Optical Networks (PON). Not all networks are designed to handle out-of-band testing and there is a risk that out-of-band OTDR light pulses (e.g. at wavelengths above 1600 nm) damage network transceivers. Aside from live fiber testing, there may be circumstances where OTDR acquisitions are launched into fiber links connected to a network transceiver such as an SFP (Small Form-factor Pluggable) transceiver. There is then a risk that a network transceiver be damaged by in-band or out-of-band OTDR light pulses. When troubleshooting such fiber links, some OTDR users may have to resort to guessing as to OTDR acquisition conditions that will not damage the transceivers.

Typically, transmitters can be very robust against OTDR pulses compared to receivers. Under normal conditions, a transmitter will not be damaged by an OTDR pulse. On the receiver side, it was found that although pulse widths of 5 or 10 ns are generally safe in normal operation of state-of-the-art OTDRs, failures may occur with pulses as short as 30 ns. The problem is that such short pulses often offer insufficient dynamic range for link troubleshooting.

There is therefore a need for OTDR measurements with a safe mode that would be both safe for transceivers and allow fault finding within a fiber link.

SUMMARY

In accordance with one aspect, there is provided a safe-mode OTDR method for characterizing an optical fiber link having a proximal end and a distal end, a communication device being connected at the distal end of the optical fiber link.

The method first includes the following steps of:
a) obtaining initial OTDR acquisition conditions that are safe for the communication device;
b) performing an OTDR acquisition along the fiber link using an OTDR apparatus connected at the proximal end of the optical fiber link and operating under said OTDR acquisition conditions, thereby obtaining at least one reflectometric trace representing a proximal portion of the optical fiber link;
c) determining a partial-link loss value associated with the proximal portion of the optical fiber based on the OTDR acquisition performed at step b);
d) if the reflectometric trace extends to the distal end of the optical fiber link or to a break in said optical fiber link, determining modified OTDR acquisition conditions that are safe for the communication device based on the partial-link loss value determined at step c) and on maximum rating parameters for the communication device, and repeating steps b), c) and d) using said modified OTDR acquisition conditions.

In accordance with another aspect, there is also provided an OTDR apparatus for characterizing an optical fiber link. The optical fiber link has a proximal end and a distal end, and a communication device is connected at the distal end of the optical fiber link.

The OTDR apparatus includes an acquisition module connectable at the proximal end of the optical fiber link and configured to perform a plurality of OTDR acquisitions along the fiber link.

The OTDR apparatus also includes a safe-mode module. The safe-mode module is configured to:
a) obtain initial OTDR acquisition conditions that are safe for the communication device;
b) perform an OTDR acquisition along the fiber link using the acquisition module and operating under said OTDR acquisition conditions, thereby obtaining a reflectometric trace representing a proximal portion of the optical fiber link;
c) determine a partial-link loss value associated with the proximal portion of the optical fiber based on the OTDR acquisition performed at step b);
d) if the reflectometric trace extends to the distal end of the optical fiber link or indicates a fault in said optical fiber link, determine modified OTDR acquisition conditions that are safe for the communication device based on the partial-link loss value determined at step c) and on loss-related maximum rating parameters for the communication device, and repeat steps b), c) and d) using said modified OTDR acquisition conditions.

In accordance with yet another aspect, there is also provided a non transitory computer readable storage medium with a computer program stored thereon. The computer program is operable to perform a safe-mode OTDR method for characterizing an optical fiber link having a proximal end and a distal end, a communication device being connected at the distal end of the optical fiber link. The computer program instructs one or more processors to perform the steps of:
b) obtaining OTDR acquisition conditions that are safe for the communication device;
c) instructing an OTDR apparatus connected at the proximal end of the optical fiber link to perform an OTDR acquisition along the fiber link under said OTDR acquisition conditions, and obtaining from said OTDR apparatus a reflectometric trace representing a proximal portion of the optical fiber link;
d) determining a partial-link loss value associated with the proximal portion of the optical fiber based on the OTDR acquisition performed at step b);
e) if the reflectometric trace extends to the distal end of the optical fiber link or indicates a fault in said optical fiber link, determining modified acquisition conditions that are safe for the communication device based on the partial-link loss value determined at step c) and on loss-related maximum rating parameters for the communication device, and repeating steps b), c) and d) using said modified OTDR acquisition conditions.

Other features and advantages of the invention will be better understood upon a reading of embodiments thereof with reference to the appended drawings.

DETAILED DESCRIPTION

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments. Some mechanical and/or optical elements may also be omitted on some or all of the figures in order to better emphasize inventive aspects of the illustrated embodiments.

The present specification generally relates to the characterization of an optical fiber link in a "safe-mode".

Figure 1A:
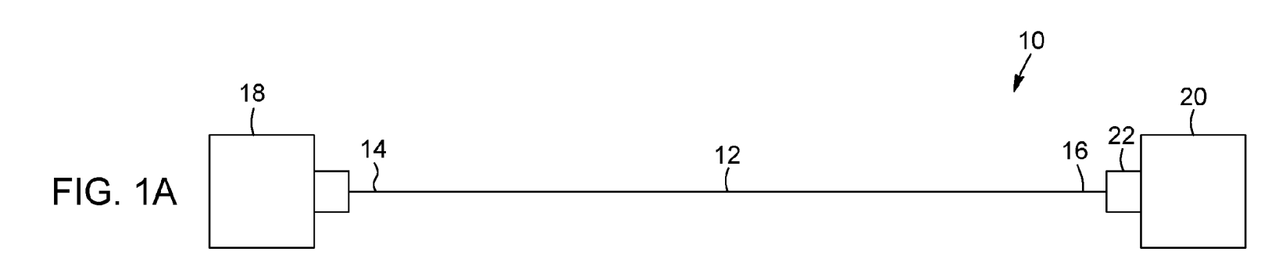
FIGS. 1A to 1C are schematic representations of optical fiber network configurations.
Figure 1B:
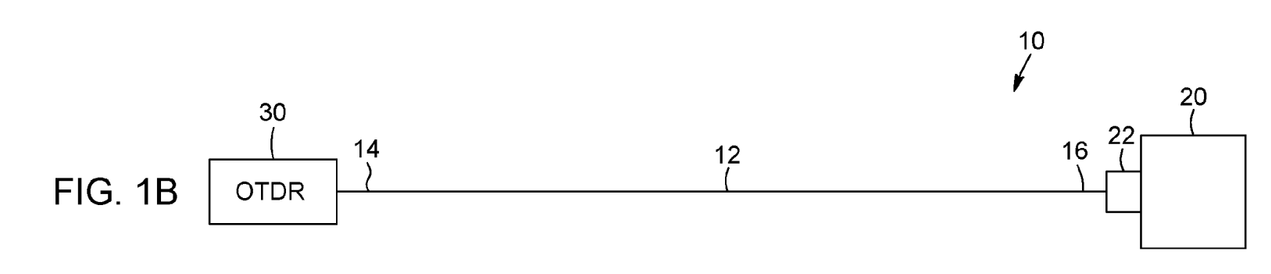
Figure 1C:
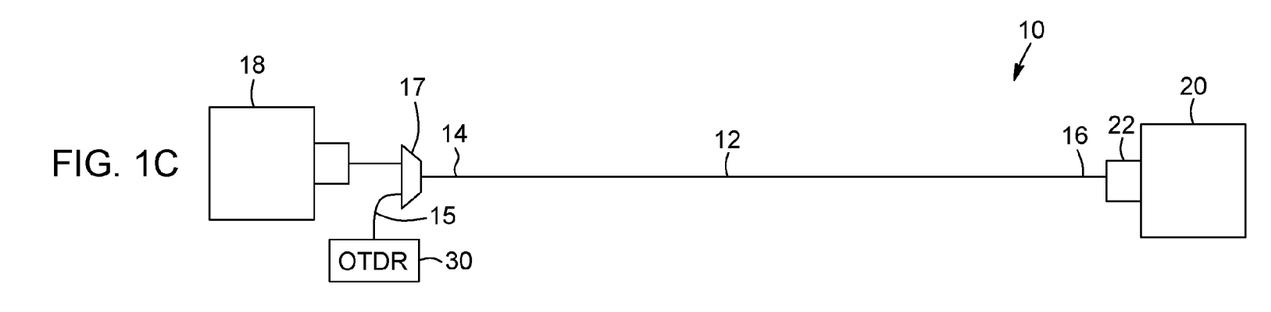

Referring to FIGS. 1A to 1C, components of an optical fiber network 10 which may be tested according to implementations of the present method are schematically illustrated, according to different exemplary configurations. The optical fiber link 12 may be embodied by a portion of the optical fiber network 10 which may be a long-distance telecommunication network, a Passive Optical Network (PON) or a Local Area Network (LAN). It will be further understood by one skilled in the art that while the examples below are given within the simplified context of a single fiber link 12, embodiments of the present description may be adapted to point-to-multipoint networks, for example such as Passive Optical Networks (PONs).

With particular reference to FIG. 1A, the optical fiber link 12 tested by the present method is understood to have a proximal end 14 and a distal end 16. The proximal end 14 may be connected to first network unit 18, whereas the distal end 16 may be connected to a second network unit 20. The second network unit 20 includes a communication device 22 which is connected at the distal end 16 of the optical fiber link 12. The communication device 22 may for example be embodied by an optical transmitter or an optical receiver.

An OTDR apparatus 30 is connected at the proximal end 14 of the optical fiber link 12. As will be readily understood by one skilled in the art, OTDR apparatuses may be used in different configurations according to the circumstances of a particular test. Referring to FIG. 1B, in one example, the first network unit 18 may be disconnected from the proximal end 14 of the fiber link 12 and replaced by the OTDR apparatus 30. In another example, such as shown in FIG. 1C, the OTDR apparatus 30 may be coupled to the proximal end 14 through a tap 15 and a WDM coupler 17, in a monitoring-type configuration.

It will be understood that the expressions "proximal end" and "distal end" of the fiber link 12 are herein defined with respect to the location of the OTDR apparatus on the fiber link 12, and not relative to a preferred communication direction through the optical network. The proximal end 14 therefore corresponds to the extremity of the fiber link 12 to which the OTDR apparatus is coupled, whereas the distal end 16 corresponds to the opposite extremity, towards which the OTDR optical pulses are launched. The OTDR apparatus may be coupled to any end of the fiber link 12, notwithstanding the communication direction or other factors.

In some implementations, the method described herein may be performed while the optical fiber link is under service. The expression "under service" refers to an optical fiber link which is carrying a communication signal, the method described herein being therefore apt to be carried out without interrupting the normal operation of the network. As explained above, transmitters and especially receivers at the distal end of an optical fiber link may be susceptible to damage by optical pulses typically used in OTDR testing if there is no filter to reject out-of-band OTDR signal in front of the transceiver. However, it will be understood that communication devices may be damaged by OTDR optical pulses whether or not the OTDR testing is performed on live optical fiber links, and that in other implementations the present method may be performed while the optical fiber link is not in service. The safe-mode method described herein therefore provides for the testing of optical fiber links that mitigates the risks of damaging the communication device at the distal end of the fiber link, whether live or not.

The acronym OTDR is understood to refer to "Optical Time-Domain Reflectometry". In accordance with the general understanding of one skilled in the art, OTDR usually involves using an OTDR apparatus to launch test light pulses along an optical fiber link and detect the returning light, which is analyzed in order to characterize the fiber link. It will be readily understood that several variants of OTDR exist and may be devised, and that the use of this designation herein in not meant to limit the scope of the present description to one such variant.

In OTDR testing, the light travelling along the fiber link will return towards its point of origin either through backscattering or reflection. The acquisition of the return light signal as a function of time is referred to herein as a reflectometric trace, where the time scale is representative of distance between the OTDR apparatus and a point along the fiber link reached by the pulse. "Backscattering" refers to Rayleigh scattering occurring from the interaction of the travelling light with the optical fiber media all along the fiber link, resulting in a generally sloped background light on the reflectometric trace, whose intensity disappears at the end of the range of the travelling pulse. OTDR acquisitions typically allow the characterization of events along the fiber link, which may be embodied by any perturbation along the fiber link which affects the returning light pulses.

Safe-Mode OTDR Method

Figure 2:
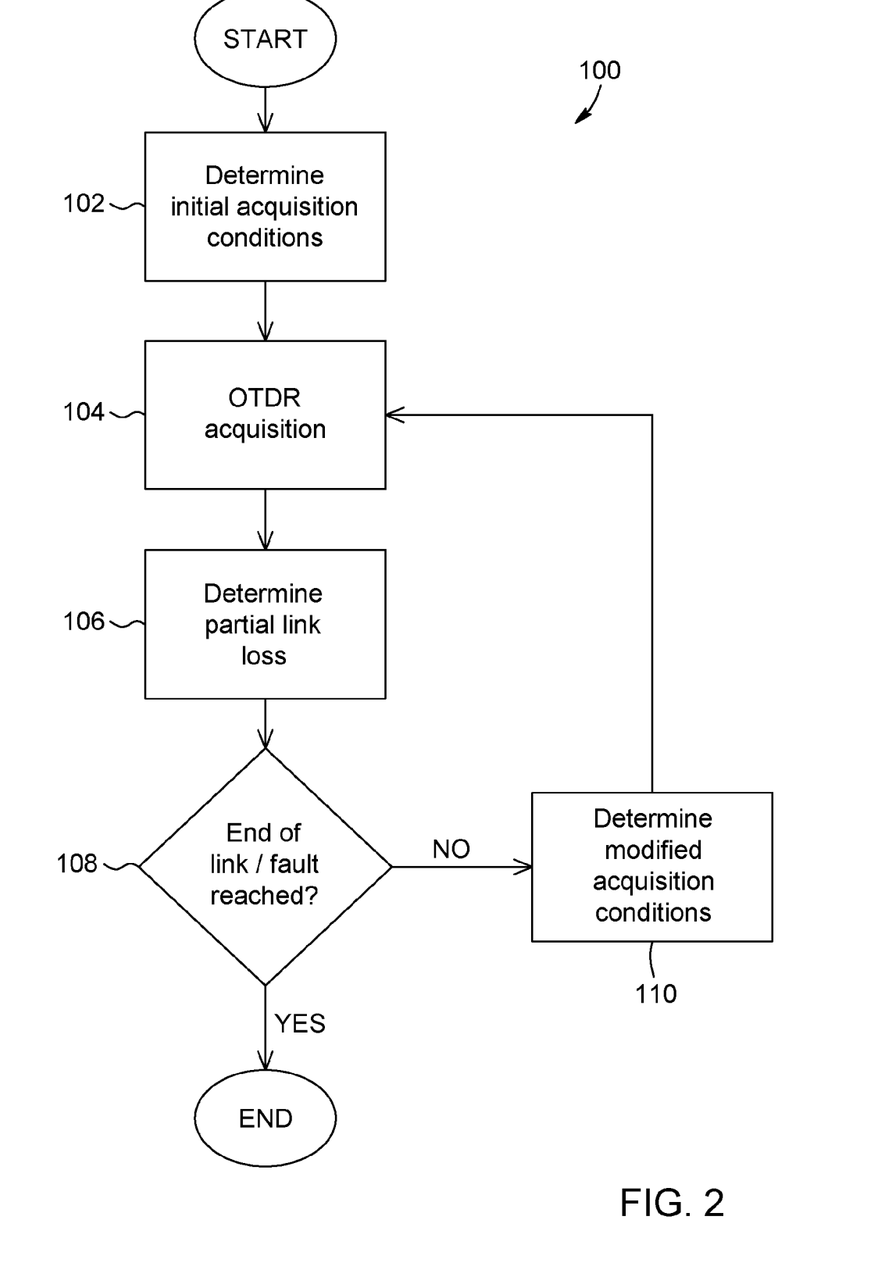
FIG. 2 is a flow chart of a method according to one implementation.

Referring to FIG. 2, there is shown a flow chart illustrating a method 100 according to one implementation.

Referring to FIGS. 1A to 1C and FIG. 2, the method 100 first includes a step 102 of obtaining OTDR acquisition conditions, also referred to herein as the initial OTDR acquisition conditions, that are safe for the communication device 22. The initial OTDR acquisition conditions may for example be based on an initially stipulated loss value in the optical fiber link 12 or on a acquisition conditions that were empirically predetermined to be safe for the communication device 22. The expression "acquisition conditions" is understood in the context of the present description to refer to parameters of the test light pulses launched in the fiber link, such as their pulsewidth, wavelength, pulse power, pulse repetition rate, etc.

In one implementation, maximum rating parameters for the communication device are provided. The maximum rating parameters may correspond to testing conditions that have been empirically determined as safe for the specific communication device connected to the distal end of the fiber link, or for all or most similar devices available on the market, or be provided by communication device manufacturers. The maximum rating parameters may for example include a maximum pulse energy value, a maximum average power value and/or a maximum pulse power value of test light pulses that have been deemed safe to be received by such devices. The maximum rating parameters may for example be pre-recorded in the OTDR apparatus during its manufacturing. Alternatively, customer-specific maximum rating parameters that are user-selected or pre-recorded are also possible. In one embodiment, the maximum rating parameters define the maximum allowable pulse width for a given peak power of pulses impinging on the communication device. This relationship may be predetermined empirically or be provided by the communication device manufacturer. For example, this relationship may be provided in the form of a lookup table. In another embodiment, the maximum allowable pulse width is defined by a maximum allowable pulse energy or a maximum product value of the pulse width and pulse power, the maximum allowable pulse energy or the maximum product value being predetermined empirically or provided by the communication device manufacturer. A mathematical relationship can then be established between the peak power of the OTDR pulses at the distal end of the optical fiber link and the maximum allowable pulse width.

The initial OTDR acquisition conditions may for example be based on an initially stipulated loss value in the optical fiber link 12. In one implementation, the initially stipulated loss value in the optical fiber link 12 is null. The OTDR acquisition conditions are therefore initially selected from the maximum rating parameters (in compliance with a maximum pulse energy value, a maximum average power value and/or a maximum power value of test light pulses), i.e. such that the OTDR acquisition conditions would be safe if the test light pulses were to propagate in the fiber link 12 with no loss at all, and therefore all of the optical power in the test light pulse was to impinge on the communication device 22 at the distal end 16 of the fiber link 12. One skilled in the art will readily understand that this hypothesis corresponds to a "worst case scenario" for the safety of the communication device 22, which is somewhat unrealistic as light travelling in real optical fibers usually experience some level of loss. In other implementations, the initially stipulated loss value may be a non-null value predetermined to be reached in the context of the network under test. In other implementations, the initial OTDR acquisition conditions may be based on acquisition conditions that were empirically predetermined to be safe for the communication device 22.

The method next includes a step 104 of performing an OTDR acquisition along the fiber link 12, using an OTDR apparatus 30 connected at the proximal end 14 of the optical fiber link 12. The OTDR apparatus 30 is initially operated with the initially determined OTDR acquisition conditions mentioned above.

An OTDR acquisition is understood to refer to the actions of propagating one or more test light pulses in the optical fiber link and detecting a return light signal from this optical fiber link. The OTDR acquisition provides at least one reflectometric trace representing a proximal portion of the optical fiber link. As the distance reached by the OTDR light pulses along the optical fiber link scales directly with the pulsewidth and other parameters of the acquisition conditions, a short, safe light pulse under the zero loss assumption is likely to travel only a short distance with respect to the overall length of the fiber link.

The method 100 may involve characterizing the proximal portion of the fiber link based on the reflectometric trace or traces obtained from the OTDR acquisition.

OTDR approaches allow the characterization of events along the fiber link such as a fiber splice, a break, a mating connector, a splitter or other component in the link, etc. The characterizing of such events along the proximal portion of the fiber link may include determining at least one of a location, a loss or a reflectance parameter for of these events. The reflectometric trace or traces may be used to determine or deduce information on the fiber link according to a variety of known techniques.

The OTDR acquisition may include propagating several test light pulses along the fiber link. One skilled in the art will readily understand that in the context of OTDR methods and apparatuses, each acquisition with a given set of parameters generally involves propagating a large number of light pulses in the optical fiber link and averaging the results. Furthermore, the acquisition conditions for a given OTDR acquisition may include different sets of operating parameters aiming to characterize the proximal portion of the fiber link. For example, using pulses of a same pulsewidth or shorter, test light pulses with varying gain and/or bandwidth may be used successively to allow the determination of different parameters characterizing the events along the proximal portion of the fiber link. In some implementations, the characterizing of the fiber link may involve a multipulse analysis as described, for example, in US 2013/0088718 A1 to Perron et al. and commonly owned by the Applicant, the specification thereof being hereby incorporated herein by reference in its entirety.

The method 100 next includes a step 106 of determining a partial-link loss value associated with the proximal portion of the optical fiber based on the performed OTDR acquisition. The partial-link loss value can be calculated from the reflectometric trace using any method known in the art. For example, as known in the art, the loss value associated with the proximal portion may be obtained by calculating a difference in backscattering level on the OTDR trace, between the nearest point on the OTDR trace and the farthest point measurable on the OTDR trace (e.g. just before measurement noise becomes too large or the dynamic range of the OTDR becomes insufficient to measure the backscattering level).

The method next includes a step 108 of determining if the reflectometric trace or traces extend to the end of the optical fiber link, which may correspond to the distal end of the optical fiber link or to a break (i.e. a problem in the fiber link continuity, such as a rupture, a substantial macrobend, or a dirty or damaged connector) in this optical fiber link. If the end is reached, the OTDR process can be concluded. Otherwise, the method next involves a step 110 of determining modified OTDR acquisition conditions that are safe for the communication device 22 based on the partial-link loss value determined at the previous step, and further based on the maximum rating parameters for the communication device 22.

As mentioned above, the maximum rating parameters are preferably pre-recorded in the OTDR apparatus 30 and may for example include a maximum pulse energy value, a maximum average power value or a maximum peak pulse power value of the test light pulse, or combinations thereof. As opposed to the initial acquisition conditions, the modified acquisition conditions take into account some loss of light as the test light pulses propagate along the proximal portion of the fiber link, and therefore assume a smaller quantity of energy reaches the communication device. The modified acquisition conditions therefore allow light pulses of longer pulsewidth to be used. The method finally includes repeating the steps of performing an OTDR acquisition 104 and determining a partial-link loss value 106, and, if necessary, determining modified acquisition conditions 108 using the modified OTDR acquisition conditions determined at the previous iteration, until the reflectometric trace extends to the distal end of the optical fiber link, or a break in the optical fiber link. As each iteration provides for the characterization of a longer proximal portion of the fiber link, the measured partial link-loss will be greater, and the next modified acquisition condition will lead to the investigation of an even greater length of fiber. The present method therefore allows the progressive testing of the entire fiber link while ensuring safe operating conditions at each iteration.

As will be illustrated hereinbelow, reach of the end may be determined at step 108, e.g., from an observation that the partial-link loss value measured with modified OTDR acquisition conditions is the same as (or at least not substantially different from) that measured with a prior measurement or that the modified OTDR acquisition conditions did not allow to extend the proximal portion of the optical fiber link being measured.

Example of Implementation

With reference to FIGS. 3A to 3D, an example of the use of the method described above is illustrated, the reflectometric traces of FIGS. 3A to 3D having been numerically generated to illustrate the method. In this implementation, the maximum rating parameters are assumed to involve a rated maximum pulse width—pulse power product of 400 ns·mW, which may be predetermined to be safe to be received by the communication device 22. Furthermore, in this implementation, the acquisition condition that is being modified for successive acquisitions is a value of the pulse width of the OTDR pulses.

A typical implementation of the method described herein may be carried out as follows.

Figure 3A:
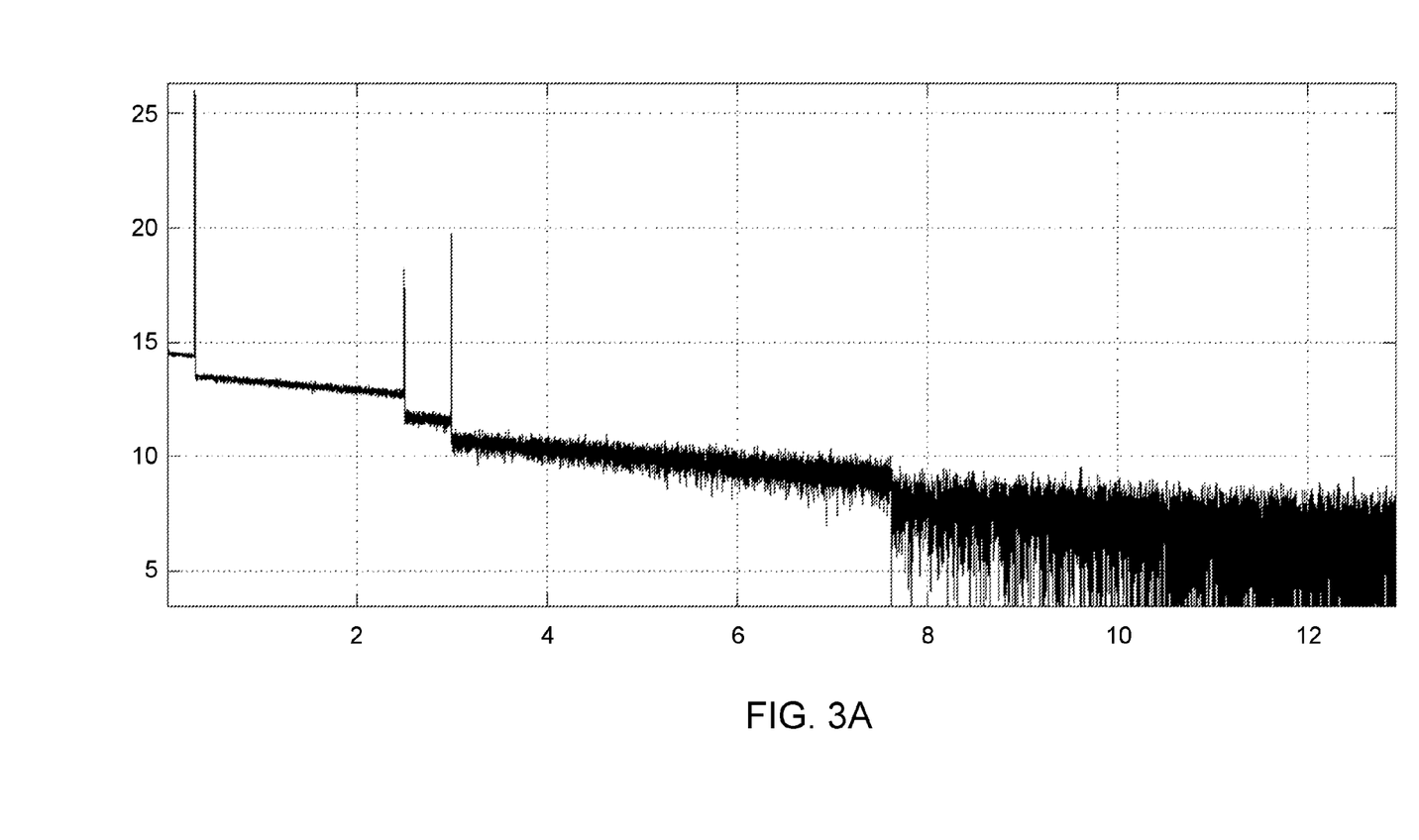
FIGS. 3A to 3D are exemplary reflectometric traces illustrating different iterations of an OTDR method according to one implementation.

1. The link loss is initially set to 0.
2. The Safe mode of the OTDR apparatus first determines the initial acquisition conditions, i.e. the OTDR emission recipe that would be safe at the end of a putative 0-dB-loss link. For example, the initial OTDR acquisition conditions may involve a rated maximum pulse width—pulse power product ($\Delta t$–$P\_product$) of 400 ns·mW. For a typical OTDR pulse power $P_0$ of 20 mW, an initial pulse width $\Delta t_0$ of 20 ns may be determined to be safe for the communication device. An OTDR acquisition involving one or more OTDR measurements is performed. FIG. 3A is an exemplary representation of a reflectometric trace obtained from the OTDR acquisition performed under the initial OTDR acquisition conditions. For this example, this relatively low dynamic-range measurement reveals that there is at least 5 dB of fiber loss along the proximal portion of the fiber link which extends to a distance of 7.5 km. A value of the partial-link loss $L_0$ is therefore determined to be 5 dB.
3. A second iteration determines the highest acquisition conditions that would be safe for a receiver at the end of a putative 5-dB-loss link. If the pulse power of the launched OTDR pulses remains unchanged, it can be determined that OTDR pulses that will reach the end of the proximal portion of the fiber link will have a pulse power $P_1$ as follows:

$$P_1 = P_0 \times 10^{(-L0/10)}$$

$$P_1 = 20 \text{ mW} \times 10^{(-5 \text{ dB}/10)} = 6.3 \text{ mW}$$

Accordingly, in order to comply with the rated pulse width—pulse power product $\Delta t$–$P\_product$ of 400 ns·mW at the end of the proximal portion of the fiber link, a modified maximum pulse width $\Delta t_1$ may be calculated:

$$\Delta t_1 = \Delta t\text{–}P\_product/P_1 = 64 \text{ ns}$$

or $$\Delta t_1 = \Delta t_0 \times P_1/P_0 = 10 \text{ ns} \times 10^{L0/10} = 64 \text{ ns}$$

Figure 3B:
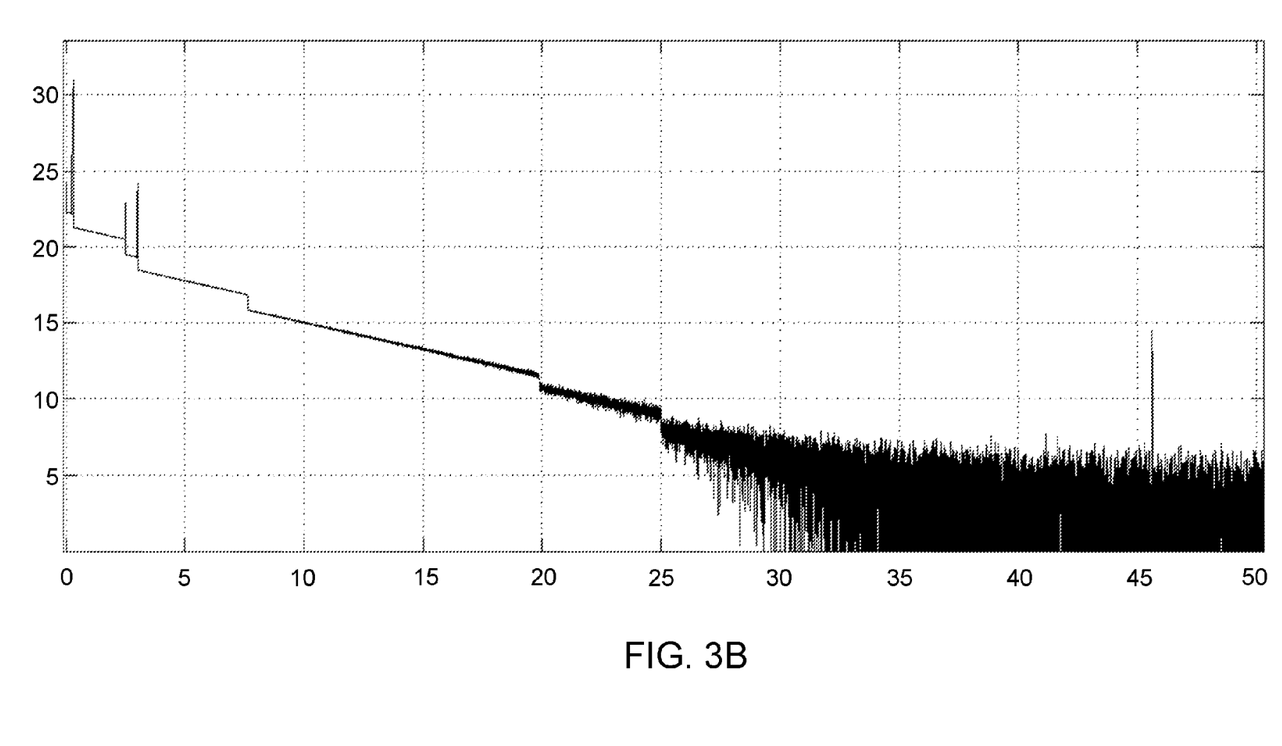

An OTDR acquisition is then performed under those conditions, i.e. using a pulse width that is shorter or equal to the calculated maximum pulse width $\Delta t_1$. An exemplary reflectometric trace obtained with a 50-ns pulse width is shown in FIG. 3B. This measurement reveals at least 14 dB of fiber loss on a proximal portion of 25 km, which corresponds to a value of the partial-link loss $L_1$ of 14 dB.

4. A third iteration determines the highest acquisition conditions that would be safe for a receiver at the end of a 14-dB-loss link. For example, as explained above, a modified maximum pulse width $\Delta t_2$ is calculated:

$$\Delta t_2 = \Delta t\text{–}P\_product/P_2 = 502 \text{ ns}$$

or $$\Delta t_2 = \Delta t_0 \times P_2/P_0 = 10 \text{ ns} \times 10^{L1/10} = 502 \text{ ns}$$

Figure 3C:
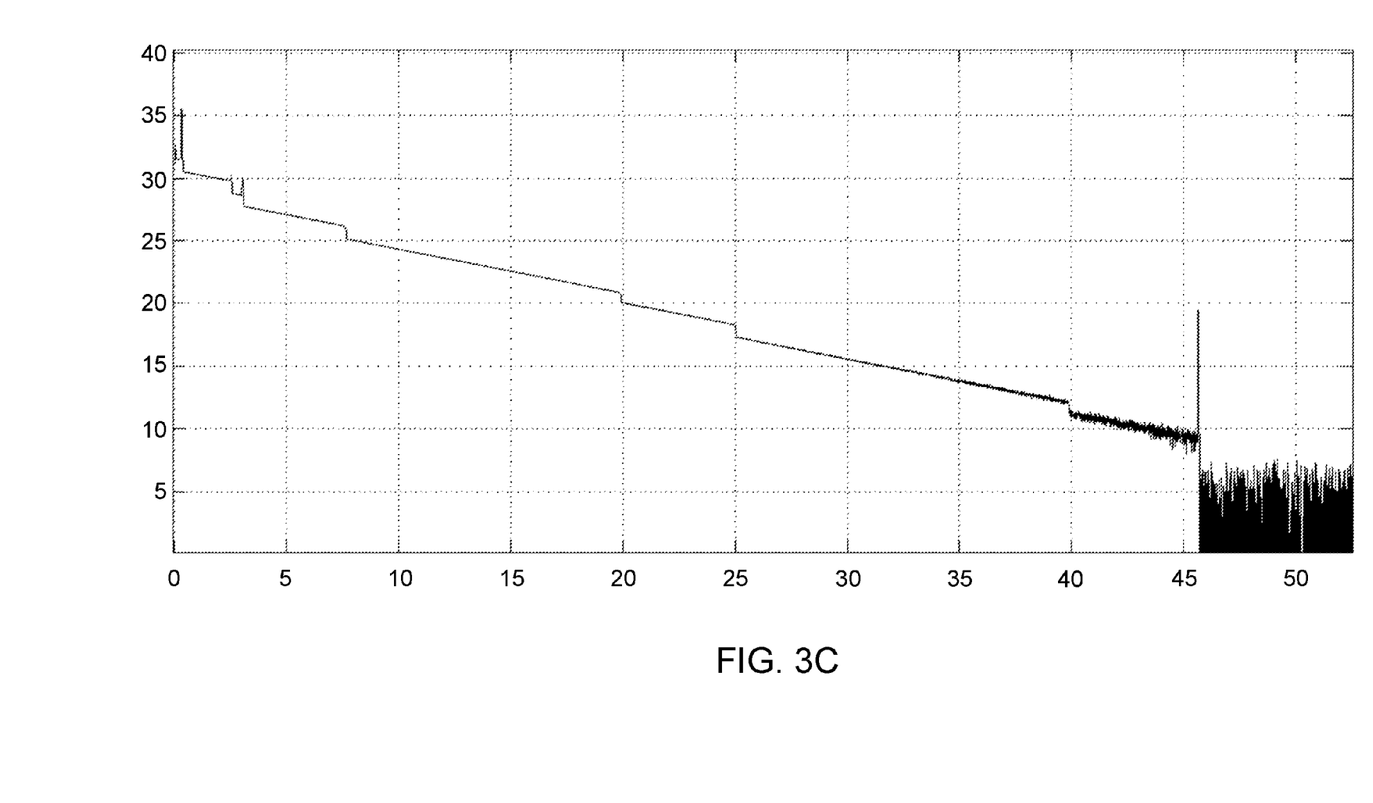

An OTDR acquisition is then performed under these conditions. An exemplary reflectometric trace obtained with a 500-ns pulse width is shown in FIG. 3C. This measurement reveals a value of the partial-link loss $L_2$ of 22 dB on a proximal portion of 46 km.

5. A fourth iteration determines the highest acquisition conditions that would be safe for a receiver at the end of a 22-dB-loss link. For example, as explained above, a modified pulse width is calculated:

$$\Delta t_3 = \Delta t\text{–}P\_product/P_3 = 3170 \text{ ns}$$

or $$\Delta t_3 = \Delta t_0 \times P_3/P_0 = 10 \text{ ns} \times 10^{L2/10} = 3170 \text{ ns}$$

Figure 3D:
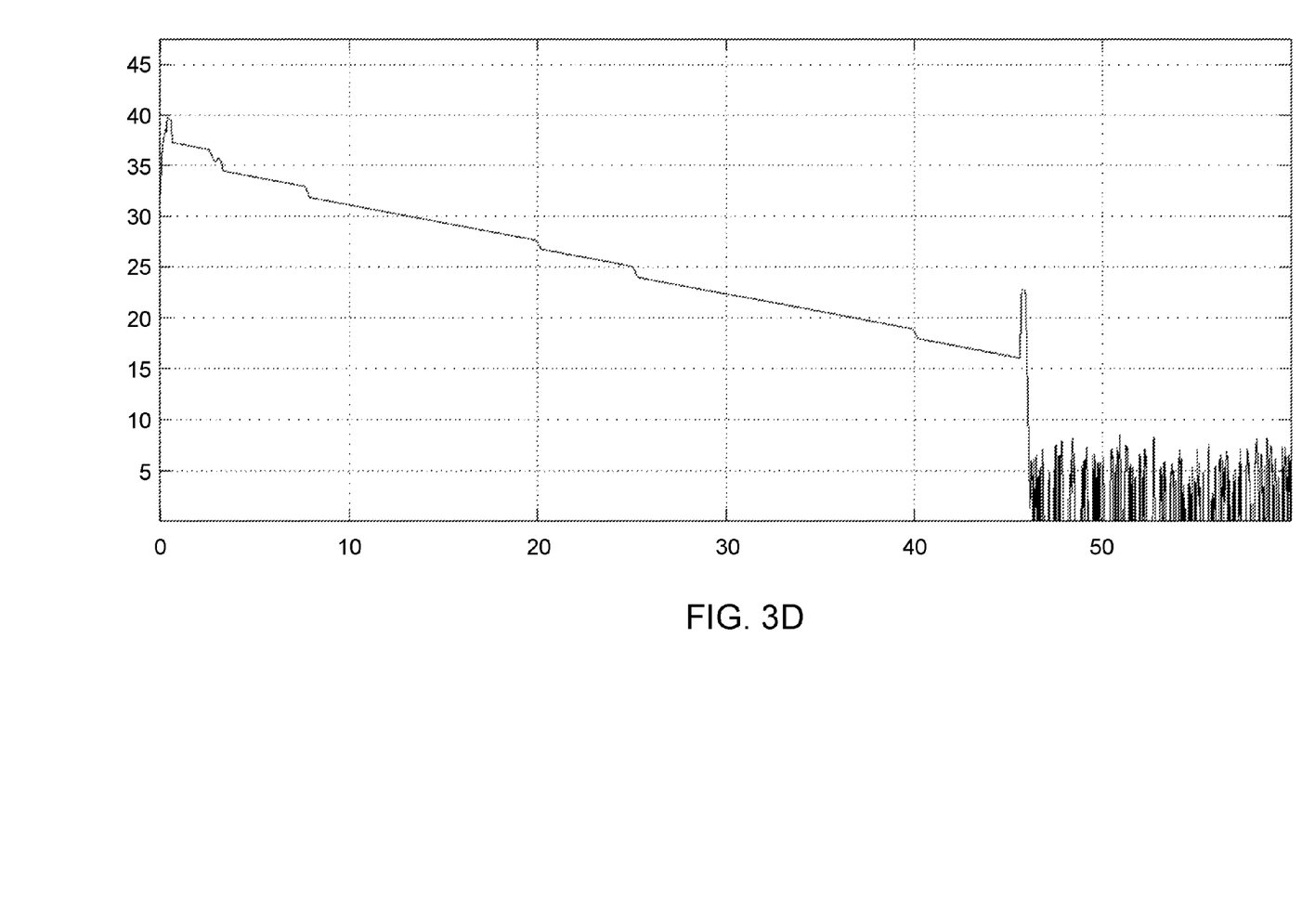

An OTDR acquisition is then performed under these conditions. An exemplary resulting reflectometric trace obtained with a 2500-ns pulse width is shown in FIG. 3D. This measurement reveals again a partial-link loss $L_3$ of 22 dB on the same proximal portion of 46 km, which indicates a substantial drop in the backscattering level. A further iteration is not available since no additional partial-link loss is revealed. The characterized portion can thus no longer be safely extended. This may indicate that the distal end or a break in the optical fiber link is reached.

The measurement is completed. The distal end of fiber or a break therein is found.

It is noted that although the rated pulse width—pulse power product $\Delta t$–$P\_product$ model presented herein is conveniently simple, other embodiments may employ a more complex model to relate the pulse width and/or other acquisition conditions to maximum rating parameters. In yet other embodiments, the maximum allowed pulse width $\Delta t_1$ may be determined from a lookup table relating the pulse power $P_n$ to the maximum allowed pulse width $\Delta t_n$.

OTDR Apparatus

Figure 4:
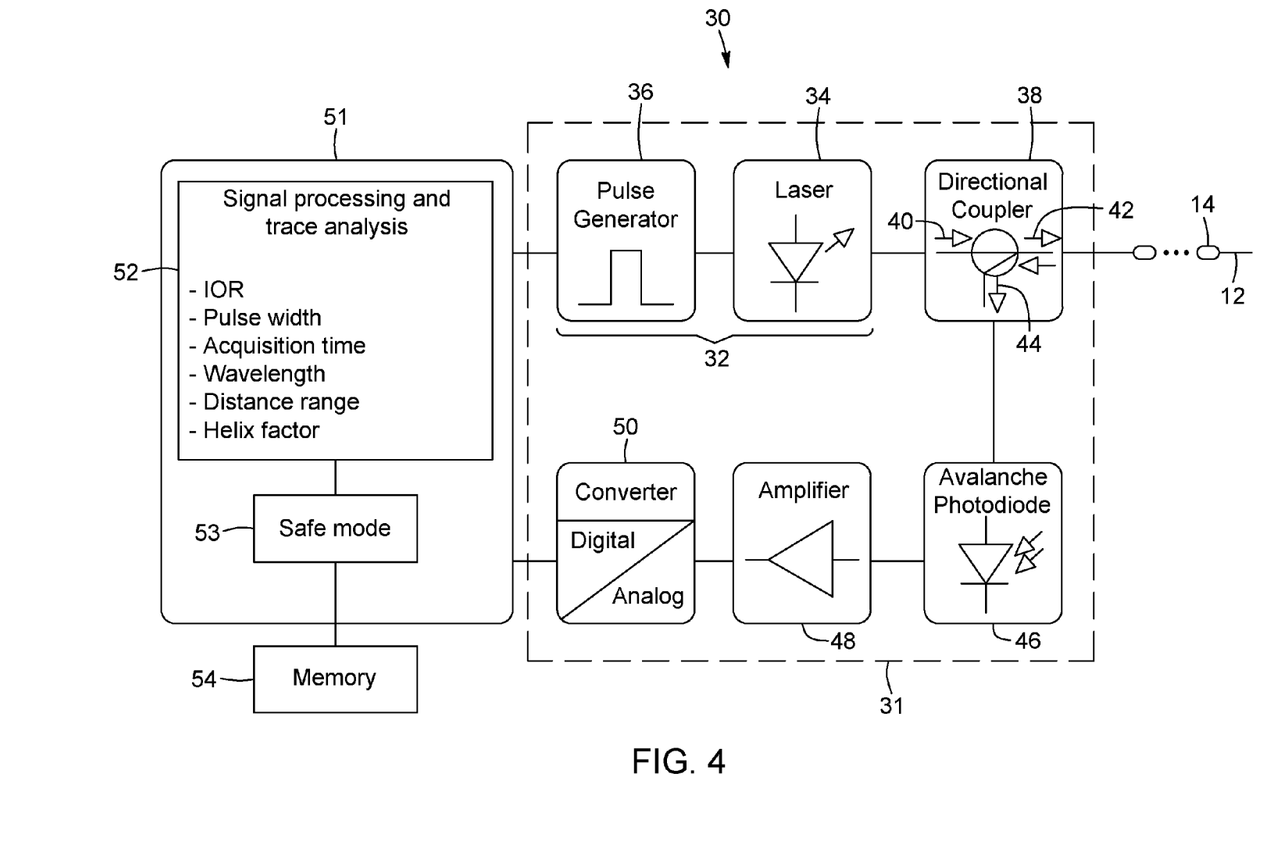
FIG. 4 is a schematic representation of an OTDR apparatus according to an embodiment.

With reference to FIG. 4, in accordance with another aspect there is provided an OTDR apparatus that may, for example, be used in order to carry out the above-described method.

The OTDR apparatus 30 includes an acquisition module 31 connectable at the proximal end 14 of the optical fiber link 12 and configured to perform a plurality of OTDR acquisitions along the fiber link 12. The acquisition module 31 may be embodied by any assembly of components and devices apt to perform OTDR acquisitions. In the illustrated embodiment, by way of example, the acquisition module 31 includes a light generating assembly 32, for example embodied by a laser 34 driven by a pulse generator 36 to generate light pulses having the desired characteristics. In some embodiments, the light generating assembly 32 may be adapted to generate light pulses having different pulsewidths, for example through a proper control of the pattern produced by the pulse generator 36. In some embodiments, the light generating assembly 32 is adapted to generate light pulses having different wavelengths, for example by using a tunable laser or the like. The light generating assembly may also combine both pulsewidth and wavelength controlling capabilities. Of course, different and/or additional components may be provided in the light generating assembly 32, such as modulators, lenses, mirrors, wavelength selectors and the like.

In the illustrated embodiment, the laser 34 is coupled to the optical fiber link 12 through a directional coupler 38, such as, for example, a circulator or a 50/50 coupler, having three or more branches. The first branch 40 is connected to the laser 34 to receive the light pulses therefrom, the coupler 38 outputting these pulses to the second branch 42 which is connected to the optical fiber link 12. The second branch 42 also receives the return light signals from the optical fiber link 12, which is circulated and outputted to the third branch 44. The third branch 44 is connected to an appropriate detecting module, for example an avalanche photodiode 46, which detects the return light signal for each test light pulse. In the illustrated embodiment, the detected signals are amplified by an amplifier 48 and converted from analog to digital by a converter 50.

In some embodiments (not illustrated), an internal reference reflector can be used in a fourth branch of the directional coupler. This reference reflector allows fluctuations in OTDR power levels due to aging or thermal effects to be tracked and compensated by performing normalization between acquisitions, thereby providing more accurate measurements (see U.S. Pat. No. 5,754,284 (LEBLANC et al.)).

The OTDR apparatus 30 may further include a control unit 51 including one or a plurality of processors, schematically and conceptually illustrated as a single box on the diagram of FIG. 4. The control unit 51 may include one or more computer programs instructing the processor or processors to perform the method as described above and other operations of the OTDR apparatus. In the illustrated variant, the control unit 51 includes an analyzing module 52 for analyzing the detected return light signals from the acquisition module 31. The analyzing module 52 may be embodied by components, software or the like, and may be integral or external to the OTDR apparatus 30. The analyzing module 52 may perform the calculations necessary to characterize events along the optical fiber link. The analyzing module 52 may be apt to control the acquisition conditions for each light acquisition, by controlling the light generating assembly 32 to generate test light pulses according to various acquisition conditions. In the illustrated embodiment, the analyzing module 52 integrates signal processing and trace analysis hardware and software, which also control the pulse generator 36.

The control unit 51 also includes a safe-mode module 53. The safe-mode module 53 is configured to carry out the steps of the safe-mode OTDR method such as described above, for example through collaboration with the analyzing module 52. The safe-mode module is therefore configured to:

a) obtain OTDR acquisition conditions that are safe for the communication device;
b) perform an OTDR acquisition along the fiber link using the acquisition module and operating under said OTDR acquisition conditions, thereby obtaining a reflectometric trace representing a proximal portion of the optical fiber link;
c) determine a partial-link loss value associated with the proximal portion of the optical fiber based on the OTDR acquisition performed at step b);
d) determine if the reflectometric trace extends to the distal end of the optical fiber link or indicates a fault in said optical fiber link, and if not, determining modified acquisition conditions that are safe for the communication device based on the partial-link loss value determined at step c) and on maximum rating parameters for the communication device, and repeating steps b), c) and d) using the modified OTDR acquisition conditions.

The OTDR apparatus 30 may in some implementations include a memory 54 in communication with the safe mode module and storing, e.g., the maximum rating parameters. As mentioned above, the maximum rating parameters may for example be pre-recorded in the memory 54 of the OTDR apparatus 30 during its manufacturing. Alternatively, customer-specific maximum rating parameters that are user-selected or pre-recorded are also possible.

Of course, numerous modifications could be made to the embodiments above without departing from the scope of the invention as defined in the appended claims.

The invention claimed is:

1. A safe-mode OTDR method for characterizing an optical fiber link having a proximal end and a distal end, a communication device being connected at the distal end of the optical fiber link, the method comprising the steps of:
   a) obtaining initial OTDR acquisition conditions that are safe for the communication device;
   b) performing an OTDR acquisition along the fiber link using an OTDR apparatus connected at the proximal end of the optical fiber link and operating under said OTDR acquisition conditions, thereby obtaining at least one reflectometric trace representing a proximal portion of the optical fiber link;
   c) determining a partial-link loss value associated with the proximal portion of the optical fiber based on the OTDR acquisition performed at step b);
   d) if the reflectometric trace extends to the distal end of the optical fiber link or to a break in said optical fiber link, determining modified OTDR acquisition conditions that are safe for the communication device based on the partial-link loss value determined at step c) and on maximum rating parameters for the communication device, and repeating steps b), c) and d) using said modified OTDR acquisition conditions.

2. The safe-mode OTDR method according to claim 1, wherein the communication device is one of an optical transmitter or an optical receiver.

3. The safe-mode OTDR method according to claim 1, wherein the OTDR acquisition conditions comprise a pulsewidth of OTDR test light pulses employed for the OTDR acquisition.

4. The safe-mode OTDR method according to claim 1, wherein the initial OTDR acquisition conditions are based on an initially stipulated loss value in the optical fiber link.

5. The safe-mode OTDR method according to claim 4, where the initially stipulated loss value in the optical fiber link is null.

6. The safe-mode OTDR method according to claim 1, further comprising at step c) characterizing the proximal portion of the fiber link based on said at least one reflectometric trace.

7. The safe-mode OTDR method according to claim 6, wherein said characterizing comprises determining at least one of a location, a loss or a reflectance parameter for one or more events along the proximal portion of the fiber link.

8. The safe-mode OTDR method according to claim 3, wherein the maximum rating parameters comprise at least one of a maximum pulse energy value, a maximum average power value and a maximum peak pulse power value of the OTDR test light pulses.

9. The safe-mode OTDR method according to claim 3, wherein the maximum rating parameters are based on a maximum rating model associated with the communication device.

10. The safe-mode OTDR method according to claim 3, wherein the maximum rating parameters include a set of values for the OTDR acquisition conditions that have been empirically predetermined as safe for the communication device.

11. The safe-mode OTDR method according to claim 3, wherein the maximum rating parameters are pre-recorded in the OTDR apparatus.

12. An OTDR apparatus for characterizing an optical fiber link having a proximal end and a distal end, a communication device being connected at the distal end of the optical fiber link, the OTDR apparatus comprising:
   an acquisition module connectable at the proximal end of the optical fiber link and configured to perform a plurality of OTDR acquisitions along the fiber link;
   a safe-mode module configured to:
      a) obtain initial OTDR acquisition conditions that are safe for the communication device;
      b) perform an OTDR acquisition along the fiber link using the acquisition module and operating under said OTDR acquisition conditions, thereby obtaining a reflectometric trace representing a proximal portion of the optical fiber link;
      c) determine a partial-link loss value associated with the proximal portion of the optical fiber based on the OTDR acquisition performed at step b);
      d) if the reflectometric trace extends to the distal end of the optical fiber link or indicates a fault in said optical fiber link, determine modified OTDR acquisition conditions that are safe for the communication device based on the partial-link loss value determined at step c) and on loss-related maximum rating parameters for the communication device, and repeat steps b), c) and d) using said modified OTDR acquisition conditions.

13. The OTDR apparatus according to claim 12, wherein the acquisition module comprises a light generating assembly configured to generate at least one test light pulse to perform each of said OTDR acquisitions and wherein the OTDR acquisition conditions comprise a pulsewidth of the at least one test light pulse.

14. The OTDR apparatus according to claim 12, wherein the safe-mode module is configured to obtain the initial OTDR acquisition conditions based on an initially stipulated loss value in the optical fiber link.

15. The OTDR apparatus according to claim 14, where the initially stipulated loss value in the optical fiber link is null.

16. The OTDR apparatus according to claim 12, further comprising an analyzing module configured to characterizing the proximal portion of the fiber link based on said at least one reflectometric trace.

17. The OTDR apparatus according to claim 13, wherein the maximum rating parameters are based on a maximum rating model associated with the communication device.

18. The OTDR apparatus according to claim 13, wherein the maximum rating parameters include a set of values for the OTDR acquisition conditions that have been empirically predetermined as safe for the communication device.

19. A non transitory computer readable storage medium with a computer program stored thereon, wherein the computer program is operable to perform a safe-mode OTDR method for characterizing an optical fiber link having a proximal end and a distal end, a communication device being connected at the distal end of the optical fiber link, and wherein the computer program instructs one or more processors to perform the steps of:
   a) obtaining OTDR acquisition conditions that are safe for the communication device;
   b) instructing an OTDR apparatus connected at the proximal end of the optical fiber link to perform an OTDR acquisition along the fiber link under said OTDR acquisition conditions, and obtaining from said OTDR apparatus a reflectometric trace representing a proximal portion of the optical fiber link;
   c) determining a partial-link loss value associated with the proximal portion of the optical fiber based on the OTDR acquisition performed at step b);
   d) determining if the reflectometric trace extends to the distal end of the optical fiber link or indicates a fault in said optical fiber link, and if not, determining modified acquisition conditions that are safe for the communication device based on the partial-link loss value determined at step c) and on loss-related maximum rating parameters for the communication device, and repeating steps b), c) and d) using said modified OTDR acquisition conditions.

20. The non transitory computer readable storage medium according to claim 19, wherein the step of performing an OTDR acquisition comprises generating at least one test light pulse using the OTDR apparatus and wherein the OTDR acquisition conditions comprise a pulsewidth of the at least one test light pulse.

21. The non transitory computer readable storage medium according to claim 19, further comprising at step c) characterizing the proximal portion of the fiber link based on said at least one reflectometric trace.

* * * * *